Patented Oct. 25, 1932

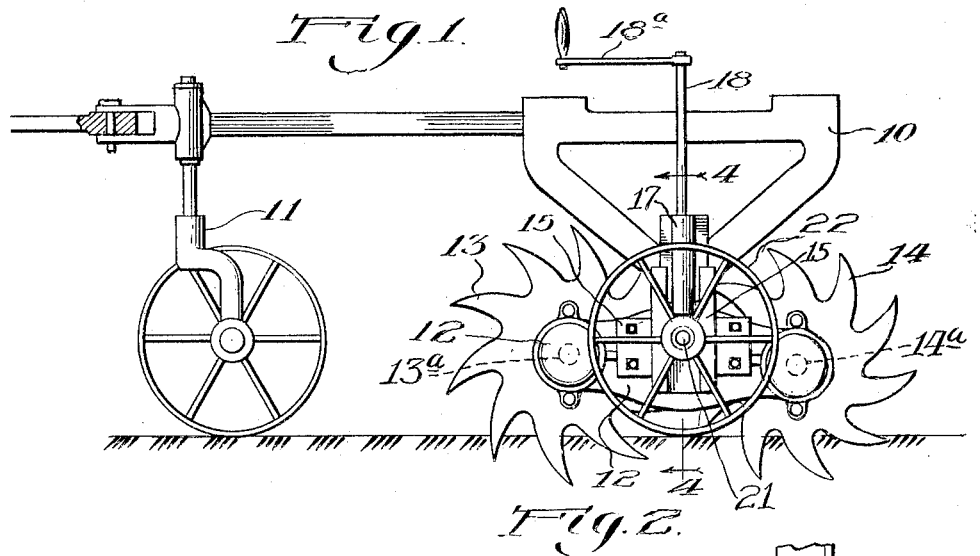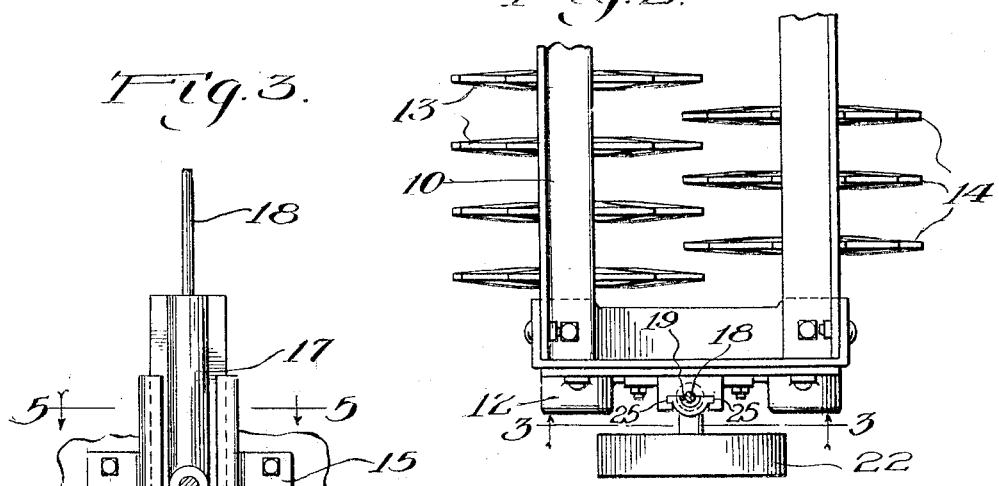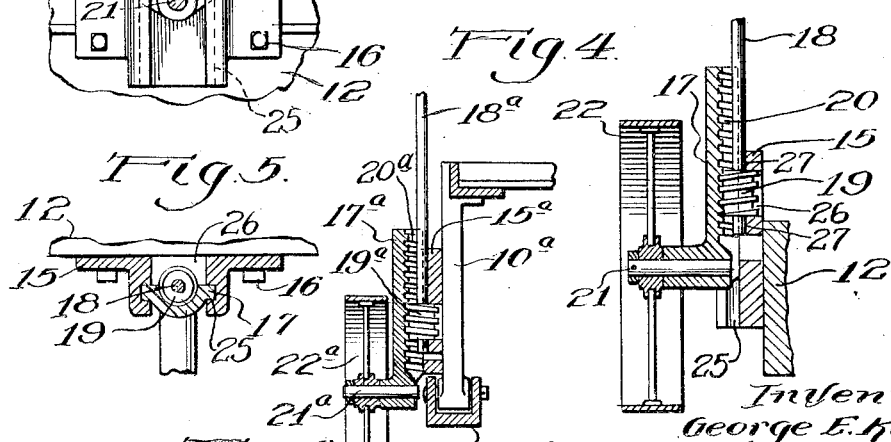

1,884,719

UNITED STATES PATENT OFFICE

GEORGE E. KARL, OF BEREA, OHIO, ASSIGNOR TO THE DUNHAM COMPANY, OF BEREA, OHIO, A CORPORATION OF OHIO

TRANSPORTING AND DEPTH REGULATING WHEEL

Application filed March 8, 1930, Serial No. 434,227. Renewed April 13, 1932.

An object of this invention is to provide an improved form of transporting and depth regulating wheels for rotary hoes, soil pulverizers, and other tillage implements.

This and other objects, as will hereinafter appear, are accomplished by this invention which is fully described in the following specification and shown in the accompanying drawing, in which—

Figure 1 is a side elevation of a tillage implement embodying the invention;

Fig. 2 is a partial plan view of one end of the same;

Fig. 3 is a partial enlarged vertical elevation on the line 3—3 of Fig. 2;

Fig. 4 is a partial enlarged vertical section on the line 4—4 of Fig. 1;

Fig. 5 is a horizontal section on the line 5—5 of Fig. 3;

Fig. 6 is a vertical section similar to that of Fig. 4 showing a modification of the invention.

The embodiment illustrated shows the invention as applied to a rotary hoe or harrow which has a weight frame 10, preferably having a forecarriage 11 of any well known form, the frame being rockably connected at each end to a side frame 12, such as is fully shown and described in the application of Wiley J. Dunham, Serial No. 361,303. The weight frame 10 is usually provided with a suitable seat for the driver, and is adapted to receive weights of various kinds, such as stones, sacks of sand, and the like, which may be added at will to provide additional weight for the tillage tool when the soil conditions indicate such additional weight to be necessary.

Front and rear gangs of rotary hoes 13 and 14 respectively are mounted in a well known manner upon shafts 13ª and 14ª shown in dotted lines in Fig. 1 which are suitably journaled in bearings in the ends of the side frames 12.

In the form shown in Figs. 1 to 5, upon the outside of each of the side frames 12 is mounted depth regulating mechanism which comprises a guide member 15, a slide 17, and a worm 19 keyed to a vertical shaft 18. The guide member 15 is attached to the side frame 12 in any suitable manner, such as bolts 16. The guide member 15 is provided with vertical grooves 25, an opening 26, and bearings 27. The grooves receive tongues which project from the slide 17, the opening 26 and the bearings 27 receive the worm 19 and the shaft 18 respectively.

The slide is provided with a circular toothed rack 20 which engages the worm and is further provided with a stub axle 21, upon which is journaled a wheel 22. It will be noted that the worm 19 is held in the guide member 15 by the slide 17, and is capable of only rotating movement therein.

Thus it will be seen that the wheel 22 can be raised and lowered by means of the handle 18ª on the shaft 18 which moves the slide 17 up and down by means of the worm 19 operating upon the rack 20. This wheel, bearing as it does upon the ground as shown in Fig. 1, serves as a depth regulator for the rotary hoe wheels 13 and 14. When it is desired to change the depth to which these rotary hoe wheels will penetrate the soil, the operator turns the shaft 18 by means of the handle 18ª until the wheel stands at the desired depth. Upon releasing the handle 18ª friction of the worm upon the rack will be sufficient to maintain the parts in any adjusted position.

When it is desired to transport this implement without having the tillage elements in contact with the ground, the worm 19 is turned by means of the shaft 18 until the transporting wheel 22 is lowered with respect to the side frame 12 to a point where the tillage wheels 13 and 14 will be lifted free from the ground.

In Fig. 6 is shown a modified form of the device in which the weight frame 10ª is pivotally or rockably connected to the side frame 12ª and the depth regulating device is carried on the weight frame. This is done by means of a body 15ª which is bolted to the end of the weight frame and which has slidably mounted thereon a slide 17ª which is adjustably positioned by means of a worm 19ª which meshes with a rack 20ª in the slide 17ª. The slide 17ª has a spindle 21ª upon which turns the ground engaging wheel 22ª.

Thus it will be seen that a new and practical arrangement of depth regulating and transporting wheels with a rockable implement of this character has been provided.

While I have shown and described but a few embodiments of my invention, it is to be understood that it is capable of many modifications. Changes, therefore, in the construction may be made which do not depart from the spirit and scope of the invention as disclosed in the appended claims.

I claim:

1. In an implement of the class described, a weight carrying frame having draft means, tool-carrying frames rockably connected below and to each end of the weight-carrying frame, shafts journaled in suitable boxes in said tool-carrying frames, soil-working tools on said shafts, and depth regulating wheels adjustably carried on said implement.

2. In an implement of the class described, a weight carrying frame having draft means, tool-carrying frames rockably connected below and to each end of the weight-carrying frame, shafts journaled in suitable boxes in said tool-carrying frames, soil-working tools on said shafts, and a depth regulating wheel adjustably carried on each end of said implement.

3. In an implement of the class described, a weight carrying frame having draft means, tool-carrying frames rockably connected below and to each end of the weight-carrying frame, shafts journaled in suitable boxes in said tool-carrying frames, soil-working tools on said shafts, depth regulating wheels adjustably carried on said tool-carrying frames, and a forecarriage on said draft means.

4. In an implement of the class described, a weight carrying frame having draft means, tool-carrying frames rockably connected below and to each end of the weight-carrying frame, shafts journaled in suitable boxes in said tool-carrying frames, tillage wheels on said shafts, and depth regulating wheels adjustably carried on said tool-carrying frames.

5. In an implement of the class described, a weight carrying frame having draft means, tool-carrying frames rockably connected below and to each end of the weight-carrying frame, shafts journaled in suitable boxes in said tool-carrying frames, soil-working tools on said shafts, a guide member having a vertical groove secured to the end of said implement, a slide movable in said groove, a wheel carried by said slide, and means for raising and lowering said slide to regulate the position of said wheel with respect to said implement.

6. In an implement of the class described, a weight carrying frame having draft means, tool-carrying frames rockably connected below and to each end of the weight-carrying frame, shafts journaled in suitable boxes in said tool-carrying frames, soil working tools on said shafts, a guide member having a vertical groove secured to the tool-carrying frame, a slide movable in said groove, a wheel carried by said slide, and means for raising and lowering said slide to regulate the position of said wheel with respect to said implement.

7. In an implement of the class described, a weight carrying frame having draft means, tool-carrying frames rockably connected below and to each end of the weight-carrying frame, shafts journaled in suitable boxes in said tool-carrying frames, soil-working tools on said shafts, a guide member having a vertical groove secured to the end of said implement, a slide movable in said groove, a wheel carried by said slide, and screw means inserted between said slide and guide member for raising and lowering said slide to regulate the position of said wheel with respect to said implement.

In testimony whereof, I have hereunto set my hand this 18th day of January, 1930.

GEORGE E. KARL.